United States Patent
Huch et al.

(10) Patent No.: US 7,032,061 B2
(45) Date of Patent: Apr. 18, 2006

(54) MULTIMASTER BUS SYSTEM

(75) Inventors: Martin Huch, München (DE); Jörg Müller, Untersteinach (DE)

(73) Assignee: Infineon Technologies AG, Munich (DE)

( * ) Notice: Subject to any disclaimer, the term of this patent is extended or adjusted under 35 U.S.C. 154(b) by 78 days.

(21) Appl. No.: 10/198,572

(22) Filed: Jul. 18, 2002

(65) Prior Publication Data

US 2003/0040230 A1 Feb. 27, 2003

Related U.S. Application Data

(63) Continuation of application No. PCT/DE00/04639, filed on Dec. 21, 2000.

(30) Foreign Application Priority Data

Jan. 18, 2000 (DE) ................................ 100 01 874

(51) Int. Cl.
G06F 15/173 (2006.01)
G06F 13/00 (2006.01)

(52) U.S. Cl. ..................................... 710/316; 709/244
(58) Field of Classification Search ................ 710/316; 709/244
See application file for complete search history.

(56) References Cited

U.S. PATENT DOCUMENTS

| | | | | |
|---|---|---|---|---|
| 4,672,373 A * | 6/1987 | Mori et al. | .................. | 370/406 |
| 4,797,882 A * | 1/1989 | Maxemchuk | ................ | 370/406 |
| 4,991,204 A * | 2/1991 | Yamamoto et al. | .... | 379/221.01 |
| 5,088,091 A * | 2/1992 | Schroeder et al. | .......... | 370/406 |
| 5,175,733 A * | 12/1992 | Nugent | ........................ | 370/400 |
| 5,181,017 A * | 1/1993 | Frey et al. | ................... | 709/239 |
| 5,218,676 A * | 6/1993 | Ben-Ayed et al. | .......... | 709/240 |
| 5,377,182 A * | 12/1994 | Monacos | ..................... | 370/219 |
| 5,408,646 A | 4/1995 | Olnowich et al. | | |
| 5,446,915 A * | 8/1995 | Pierce | .......................... | 712/11 |
| 5,617,413 A * | 4/1997 | Monacos | ..................... | 370/400 |
| 5,689,661 A | 11/1997 | Hayashi et al. | | |
| 5,838,684 A * | 11/1998 | Wicki et al. | ................. | 370/416 |
| 5,878,240 A * | 3/1999 | Tomko | ........................ | 710/316 |
| 5,935,232 A | 8/1999 | Lambrecht et al. | | |
| 6,023,753 A * | 2/2000 | Pechanek et al. | .............. | 712/18 |
| 6,035,366 A * | 3/2000 | Teich | .......................... | 710/316 |
| 6,085,275 A * | 7/2000 | Gallup et al. | ................ | 710/316 |
| 6,263,393 B1* | 7/2001 | Funaya et al. | .............. | 710/316 |

(Continued)

FOREIGN PATENT DOCUMENTS

DE 690 32 481 T2 10/1991

OTHER PUBLICATIONS

Schicker, P.: "Datenübertragung und Rechnernetze" [Data Transfer and Computer Networks], Teubner, vol. 3, 1988, pp. 113-143.

*Primary Examiner*—Paul R. Myers
(74) *Attorney, Agent, or Firm*—Laurence A. Greenberg; Werner H. Stemer; Ralph E. Locher

(57) ABSTRACT

A multimaster bus system includes a bus for connecting to devices connected thereto and a bus controller that controls the bus and/or the bus grant. The multimaster bus system includes providing the bus with data and/or signals paths. The bus controller can alter statically and/or dynamically the course of these paths. Such a multimaster bus system enables several connections to be simultaneously established in the easiest possible way and between the devices connected thereto.

22 Claims, 3 Drawing Sheets

U.S. PATENT DOCUMENTS

| | | | |
|---|---|---|---|
| 6,473,827 B1 * | 10/2002 | McMillen et al. | 710/316 |
| 6,480,923 B1 * | 11/2002 | Moertl et al. | 710/305 |
| 6,553,446 B1 * | 4/2003 | Miller | 710/307 |
| 6,633,946 B1 * | 10/2003 | Hendel | 710/317 |
| 6,636,930 B1 * | 10/2003 | Kaptanoglu | 710/316 |
| 2002/0144082 A1 * | 10/2002 | Barry et al. | 712/11 |
| 2003/0110342 A1 * | 6/2003 | Chiang et al. | 710/316 |
| 2003/0221056 A1 * | 11/2003 | Lee et al. | 711/114 |

* cited by examiner

MULTIMASTER BUS SYSTEM

CROSS-REFERENCE TO RELATED APPLICATION

This application is a continuation of copending International Application No. PCT/DE00/04639, filed Dec. 21, 2000, which designated the United States and was not published in English.

BACKGROUND OF THE INVENTION

Field of the Invention

The present invention relates to a multimaster bus system having a bus for connecting devices that are connected thereto, and having a bus controller that controls the bus and/or the bus allocation.

Multimaster bus systems have been in numerous prior art embodiments for many years. The basic configuration of such a bus system is illustrated in FIG. 1.

The bus system illustrated includes a bus BUS and a bus controller BC. The bus has devices U1, U2, . . . connected to it. These devices U1, U2, . . . are connected to one another through the bus and to the bus controller BC through lines, which are not shown in FIG. 1; the bus controller controls the bus and/or the bus allocation.

The devices U1, U2, . . . can be any electrical or electromechanical device. In the example under consideration, they might be various components of a microcontroller, that is to say, by way of example, its CPU, its internal memory device(s), its A/D converter, its D/A converter, its interrupt controller, its DMA controller, its interfaces to external buses and devices, etc.

The devices U1, U2, . . . can be masters, slaves, or either masters or slaves in the bus system. In the example under consideration, there are a number of devices that can be masters in the bus system (hence, the bus system under consideration in the present case is referred to as a multimaster bus system).

A device that is a master can autonomously transmit data and/or signals to one of the other devices connected to the bus, or can request and receive data and/or signals from one of the other devices connected to the bus. If a device wants to become a master, it generally needs to report this to the bus controller BC (for example, by transferring a "bus request signal" to the bus controller BC). The bus controller checks if the device in question can become a master, and, as soon as this is the case, the bus controller reports the status to the device (for example, by transmitting a "bus grant" signal to the device requesting the master authorization). Such action makes the device in question the master of the bus system for the time being.

The devices that are slaves check whether or not they are being addressed by the data and/or signals transferred through the bus, for example, by an address that is associated with them. In such a case, if a device establishes that it has been addressed, it may then check what it needs to do in this case, and then performs the action that is expected of it. By way of example, the expected action can be that the device in question accepts data sent through the bus or outputs particular data to the bus.

Bus systems of the type shown in FIG. 1 have the drawback that only one of the connected devices U1, U2, . . . can ever be a master at one time. This means that the bus can only ever be used to transfer data and/or signals between one master and a slave. Such is frequently a drawback, particularly, in cases in which a plurality of the devices connected to the bus can be masters.

Bus systems in which a plurality of the devices connected to the bus are simultaneously able to be masters and to interchange data and/or signals with various slaves are in the prior art. Such a system can be produced, by way of example, by a network of connections that connects each of the devices connected to it to all the other devices using separate lines. Such systems are called fully interconnected networks. However, the practical implementation of such and similar systems is associated with a very high level of complexity, particularly, due to the many long lines that need to be provided between the devices.

SUMMARY OF THE INVENTION

It is accordingly an object of the invention to provide a multimaster bus system that overcomes the hereinafore-mentioned disadvantages of the heretofore-known devices of this general type and that can be implemented and operated easily on a small scale and that permits a plurality of masters to communicate with a plurality of slaves simultaneously.

With the foregoing and other objects in view, there is provided, in accordance with the invention, a multimaster bus system for devices, including a bus adapted to connect at least one of the devices to at least another of the devices, the bus having at least one of data and signal paths, each of the paths having a respective configurable course, and a bus controller connected to the bus, the bus controller adapted to control at least one of the bus and allocation of the bus and to statically and/or dynamically configure the courses of the paths.

The inventive multimaster bus system is distinguished in that the bus has data and/or signal paths whose course can be configured statically and/or dynamically by the bus controller. Such a configuration provides the option of only the two devices that need to interchange data ever being connected to one another, and of those parts of the bus that are not required for setting up the connection being able to be used elsewhere, particularly, for simultaneously setting up connections between other devices.

The configuration allows a plurality of devices to be connected to other devices simultaneously, and allows these connections to be used independently of one another, and without mutual influencing, to interchange data and/or signals simultaneously.

Because the course of the data and/or signal paths that are used to set up the connections between the devices needing to be connected is configurable, the devices that need to be capable of being connected to one another do not need to be connected separately using separate lines. This means that the number and/or length of the lines that need to be provided for implementing the claimed multimaster bus system in practice can be comparatively small.

Configuration of the data and/or signal paths by the bus controller (which is present in bus systems anyway) makes it possible for the devices that are to be connected to the bus not to need modification, or, at the outside, to require insignificant modification to be able to be connected to the novel multimaster bus system. Despite their relatively simple construction, the devices needing to be connected to the novel multimaster bus system do not become more complicated. Quite the opposite: the devices needing to be connected to the bus can even be of smaller and simpler construction than has been the case to date. Due to the fact that only those devices that presently need to be connected are connected with one another, the protocol according to which the devices communicate with one another are simplified; in particular cases, it is no longer necessary, in particular, always to have to transfer, monitor, and evaluate the address of the receiver and/or of the transmitter in addition to the data and/or signals that actually need to be interchanged. The simpler protocol means that the devices needing to be connected can be of simpler construction than previously. Independently thereof, it is also no longer necessary in particular cases to provide an address bus.

The multimaster bus system can, thus, firstly be implemented and operated easily on a small scale and secondly allows a plurality of masters to communicate with a plurality of slaves simultaneously.

In accordance with another feature of the invention, the bus has configurable bus segments selectively connectable to one another.

In accordance with a further feature of the invention, the bus has connection points at which the devices are connected to the bus, and nodes are disposed between the bus segments and at the connection points, the nodes each having at least one switching device.

In accordance with an added feature of the invention, adjacent ones of the bus segments are selectively connected to one another and isolated from one another through a respective one of the nodes disposed therebetween.

In accordance with an additional feature of the invention, the nodes connect the devices to the bus.

In accordance with yet another feature of the invention, the nodes each have at least two ports and each of the at least two ports is adapted to supply one of data and signals to the nodes and to output at least one of data and signals from the nodes.

In accordance with yet a further feature of the invention, each of the ports is connected to a bus segment and/or a device to be connected to the bus.

In accordance with yet an added feature of the invention, the nodes are adapted to receive information through one of the ports, the information including at least one of data and signals, and to output the received information through at least one of the ports.

In accordance with yet an additional feature of the invention, the at least one switching device is adapted to set if a respective one of the nodes outputs the information supplied thereto and through which one of the ports of the respective node output the information supplied thereto.

In accordance with again another feature of the invention, the at least one switching device is a multiplexer.

In accordance with again a further feature of the invention, each of the ports has an associated multiplexer and information switched through by the multiplexers is information output from the ports associated with a respective one of the multiplexers.

In accordance with again an added feature of the invention, the multiplexers have input connections, information is supplied to one of the nodes having a respective one of the multiplexers, and the input connections of the multiplexers respectively have the supplied information applied thereto.

In accordance with again an additional feature of the invention, the input connections of the multiplexers have the information applied thereto that is supplied to one of the nodes through the ports with which a respective one of the multiplexers is not associated.

In accordance with still another feature of the invention, the bus controller is connected to and controls the at least one switching device.

In accordance with still a further feature of the invention, the bus controller is adapted to receive, from the devices connected to the bus:

In accordance with still an added feature of the invention, notices of a desire to use the bus to connect to another of the devices and information regarding which of the devices is to be connected thereto.

In accordance with still an additional feature of the invention, the bus controller is adapted to receive, from the devices connected to the bus, information regarding a data transfer direction for the connection requested to be established.

In accordance with another feature of the invention, the bus controller is adapted to set up the at least one data and signal path by respectively actuating the at least one switching device contained in at least one of the nodes to permit the devices connected to the bus to be connected to one another.

In accordance with a concomitant feature of the invention, the bus controller simultaneously permits a plurality of the devices connected to the bus to connect to other ones of the devices when the bus controller is able to set up the at least one data and signal path required therefor.

Other features that are considered as characteristic for the invention are set forth in the appended claims.

Although the invention is illustrated and described herein as embodied in a multimaster bus system, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

The multimaster bus system described in more detail below is part of a microcontroller and connects various parts or components of the microcontroller, such as its CPU, its internal memory device(s), its A/D converter, its D/A converter, its interrupt controller, its DMA controller, its interfaces to external buses and devices, etc.

Before continuing, however, it will be pointed out that there is no restriction thereto. The multimaster bus system described below can also be used in modules or systems other than microcontrollers and/or for connecting any other devices.

The multimaster bus system under consideration is distinguished, inter alia, by the fact that the bus has data and/or signal paths whose course can be configured statically and/or dynamically by the bus controller.

Figure 1:
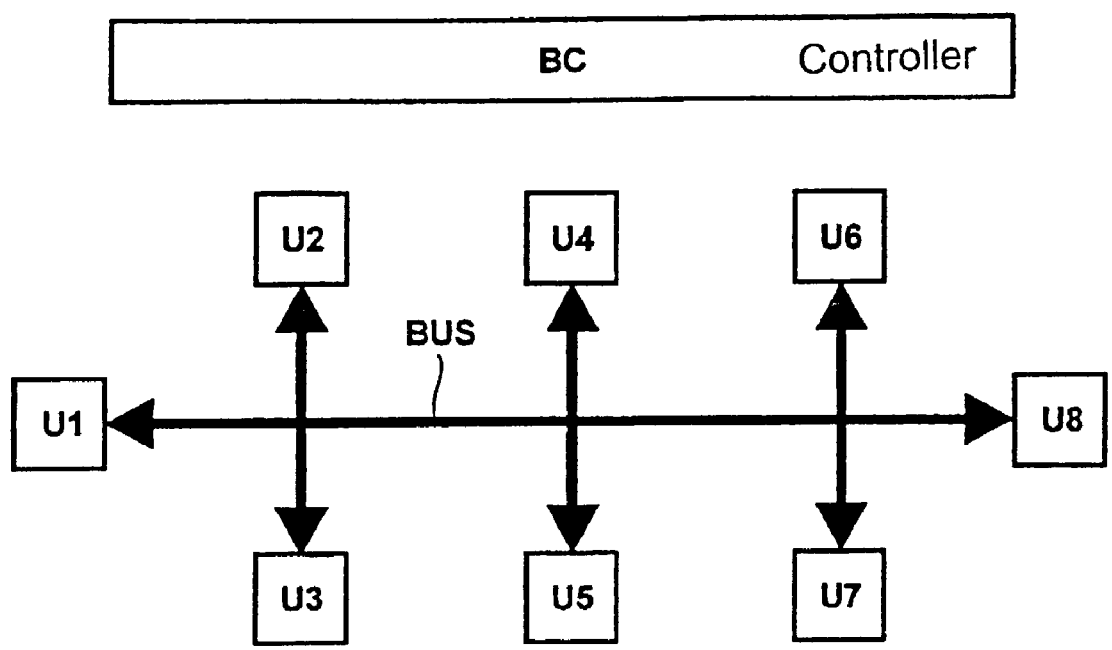
FIG. 1 is a diagrammatic illustration of a basic configuration of a conventional bus system.
Figure 2:
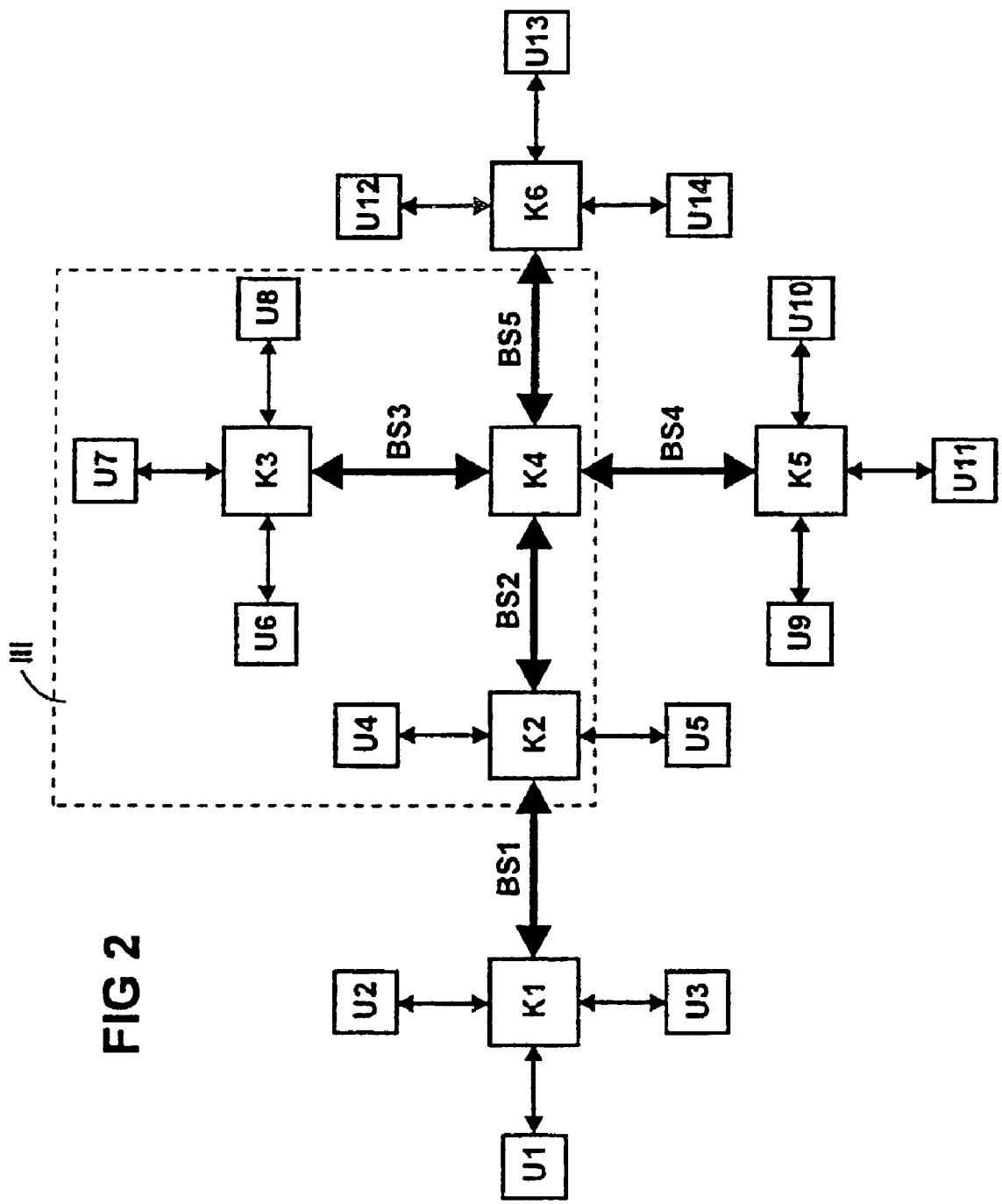
FIG. 2 is a block circuit diagram of an exemplary embodiment of the multimaster bus system according to the invention.
Figure 3:
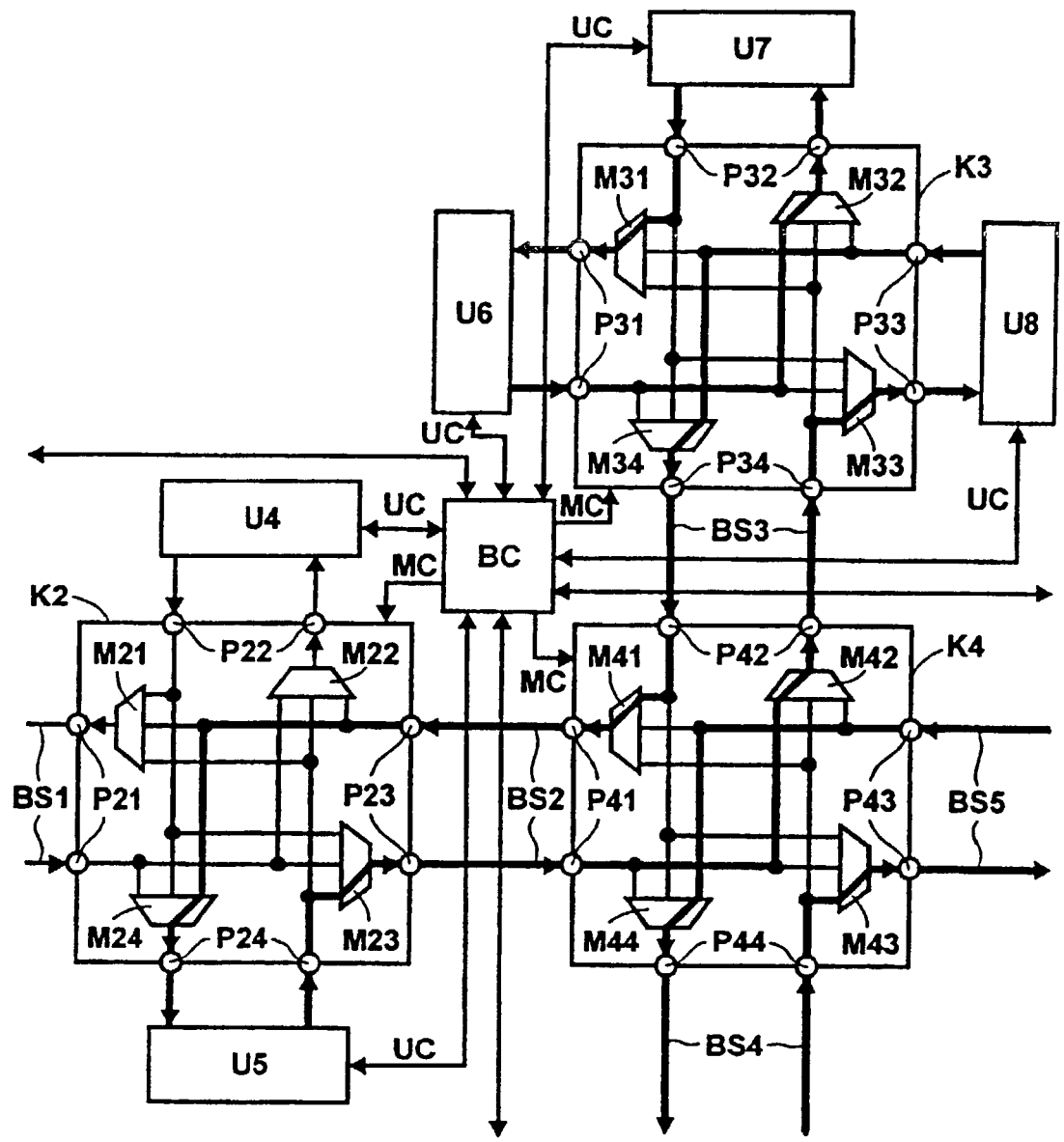
FIG. 3 is a block circuit diagram of a detailed illustration of part III in FIG. 2.

Referring now to the figures of the drawings in detail and first, particularly to FIGS. 2 and 3 thereof, there is shown an exemplary embodiment of the multimaster bus system. FIG.

2 illustrates the basic configuration of the multimaster bus system under consideration, and FIG. 3 illustrates details of a part of the configuration in FIG. 2 denoted by reference numeral III.

The multimaster bus system shown includes a bus that has bus segments BS1, BS2, . . . and units referred to below as nodes K1, K2, . . . . The nodes K1, K2, . . . are provided between the bus segments BS1, BS2, . . . and at the points at which devices U1, U2, . . . needing to be connected to the bus are connected to the bus; the nodes K1, K2, . . . are used to connect the individual bus segments BS1, BS2, . . . to one another and/or to connect to the bus the devices U1, U2, . . . that need to be connected to the bus. The multimaster bus system under consideration also includes a bus controller BC (shown only in FIG. 3) that controls the bus and the bus allocation.

As can be seen from FIG. 3, in particular, each of the nodes K1, K2, . . . in the example under consideration has four ports that can be used to supply data and/or signals to the respective nodes and from which the respective nodes can output data and/or signals. In FIG. 3, the ports are denoted by the reference symbols P21 to P24 (for the node K2), P31 to P34 (for the node K3), and by P41 to P44 (for the node K4).

At each port, either a bus segment BSx or a device Ux needing to be connected to the bus (through the node in question) can be connected.

Before continuing, it will be pointed out that there is no restriction to the number of ports per node; the respective nodes can have any greater or lesser number of ports independently of one another.

In the example under consideration, the ports Pxx respectively include a connection that can be used for inputting data into the node Kx in question and a connection that can be used for outputting data from the node in question. Consequently, the bus segments BSx and the connections to the devices Ux connected to the bus through the nodes also include two lines each. There is no restriction to such a configuration, however. The number of connections that can be used for receiving and/or outputting date, and, hence, also the number of lines in the bus segments connected thereto and of connections to the devices connected to the bus through the nodes, can be of any greater size; this is even an absolute necessity for parallel transfer of data through the bus.

Each of the nodes contains a switch network that can be used to output data and/or signals, input into a respective node through one of the ports, from the node in question through any other port of this node.

In the example under consideration, this switch network is formed by an appropriate number of multiplexers.

In the present case, one multiplexer is provided per port connection that can be used to output data and/or signals from a respective node. For the example under consideration, this means that the nodes each contain four multiplexers. These multiplexers are denoted in FIG. 3 by the reference symbols M21 to M24 (for the node K2), M31 to M34 (for the node K3), and M41 to M44 (for the node K4). The port connections that can be used to output data and/or signals from a respective node are respectively connected to the output connection of one of the multiplexers in the node in question; each such port connection has its own associated multiplexer. The multiplexers associated with the respective port connections determine what data and/or signals are output through the port connections in question.

In the example under consideration, the multiplexers have a number of input connections that is one less than the number of ports for the node in question. The input connections of the multiplexers each have the data and/or signals applied to them that are supplied to the node in question through the ports that are not associated with the multiplexer in question. In particular cases, it can turn out to be advantageous if the input connections of the multiplexers also have the data and/or signals applied to them that are supplied to the node in question through the ports that are associated with the respective multiplexers.

Which of the data and/or signals applied to the multiplexer input connections are switched through to the multiplexer output connection is determined by control data or control signals that are applied to non-illustrated control connections of the multiplexers. In the example under consideration, each multiplexer has two control connections. The control data or control signals controlling the respective multiplexers are produced by the bus controller BC and are supplied by the latter to the nodes (to the multiplexers contained therein) through control lines MC.

The bus controller BC is also connected to the devices Ux that can become masters and that are connected to the bus through the nodes Kx. These connections are denoted by the reference symbol UC in FIG. 3.

The devices connected to the bus that want to connect to one of the other devices through the bus (want to become masters) use these connections to transmit data to the bus controller, and these data reveal to the bus controller whether or not and, if appropriate, to which device the device sending the data wishes to connect. The bus controller uses the information available to it to ascertain if the required connection can be set up. If this is the case, the bus controller actuates the nodes, more precisely the multiplexers contained therein, through the control lines MC such that a continuous data and/or signal path is formed between the device that requested the connection and the device to which the connection needs to be set up. At the same time or thereafter, the bus controller signals to the device requesting the connection that it is now a master and can communicate as desired with the device to which a connection should be set up.

In such a case, the structure of the multimaster bus system described allows a plurality of connections to be set up simultaneously between devices connected to the bus, which means that a plurality of devices are simultaneously able to be masters and to communicate with other devices, more precisely with various slaves. The complexity required for such a configuration is comparatively low. The only prerequisite that needs to be satisfied for such a configuration is that, before a second, third, or further connection is set up, the bus controller checks to ensure it is not interrupting an already existing connection by doing so. Because it is the bus controller's sole responsibility to set up the connection needing to be set up by actuating the multiplexers as appropriate, the process can readily be done with little complexity. In such a case, it is naturally also possible for particular connections to be set up with high priority, that is to say, with preference immediately or as soon as possible, and for other connections to be set up with low priority, that is to say, possibly not until later. In such a case, if a connection cannot be set up immediately—for whatever reason—but needs to be set up as soon as possible, provision can be made for no other connections to be set up in the meantime that could impede or delay setup of such a connection.

In the example shown in FIG. 3, the multiplexers are actuated such that the data and signal paths shown in bold are obtained. This means that connections simultaneously exist between the device U5 and the device U8, the device U6 and the device U7, and the node K5 (for one of the devices U9 to U11) and the node K6 (for one of the devices U12 to U14), as a result of which, these are simultaneously able to communicate with one another independently of one another and without mutual influencing.

In addition, it is even possible for two of the devices selected from U1, U2, and U3 to be additionally connected to one another. Likewise, it is also possible for the two devices in node K5 and the two devices in node K6, which are not already connected to the other node through node K4, to connect with each other. As such, the configuration illustrated in FIG. 3 may result in six simultaneous connections for the multimaster bus system (U8 and U5, U6 and U7, a device in node K5 to a device in node K6, two devices in node K1, the remaining devices in node K5, and the remaining devices in K6).

In the example shown in FIG. 3, the connections between the devices and/or nodes that are to be connected include exactly two connections each: a connection that can be used to transfer data from one device or from one node to the other device or to the other node, and a connection that can be used to transfer data from the other device or from the other node to the one device or to the one node. The multimaster bus system described can be used even more flexibly and more efficiently if the bus controller can actuate the nodes, more precisely, the multiplexers contained therein, such that only one of such connections is set up between devices and/or nodes needing to be connected to one another, and the resources that would be required to set up the other of such connections as well are either not used or are used to set up connections between other devices and/or nodes. This allows even more devices and/or nodes to be connected to one another simultaneously than is already the case anyway. In the example under consideration, if, by way of example, the devices U5 and U8 were to be connected only using one or more lines used to transfer data from the device U8 to the device U5, then the resources becoming free as a result (the multiplexers M23, M33 and M42, and also the bus segment parts used to transfer data from the node K2 to the node K4, and from the node K4 to the node K3) could be put into a quiescent state (of whatever type) or could be used to connect two other devices and/or nodes.

In a multimaster bus system in which such an option exists and is to be used, at least some of the devices connected thereto need to be constructed so that, when requesting a connection to another device, they additionally specify the direction(s) in which data need to be transferred between the devices that are to be connected. However, provision can be made for messages concerning the data transfer direction(s) to be sent to the bus controller only if the required data transfer direction(s) differ(s) from a standard stipulated for the multimaster bus system in question.

The multimaster bus system and the devices connected thereto can, nevertheless, be of a simple construction. In particular—unlike in the case of a fully interconnected network, for example—it is not necessary for devices that need to be capable of being connected to one another to be permanently connected separately using separate lines. This means that the number and/or length of the lines that need to be provided for implementing the claimed multimaster bus system in practice can be comparatively very small.

Configuration of the data and/or signal paths by the bus controller (which is present in bus systems anyway) moreover makes it possible for the devices that are to be connected to the bus not to need modification, or at the outside to require insignificant modification, in order to be able to be connected to the novel multimaster bus system. Despite their relatively simple construction, the devices needing to be connected to the novel multimaster bus system do not become more complicated. Quite the opposite: the devices needing to be connected to the bus can even be of smaller and simpler construction than has been the case to date. Due to the fact that only those devices that presently need to be connected are connected with one another, the protocol according to which the devices communicate with one another are simplified; in particular cases, it is no longer necessary, in particular, always to have to transfer, monitor and evaluate the address of the receiver and/or of the transmitter in addition to the data and/or signals that actually need to be interchanged. The simpler protocol means that the devices needing to be connected can be of a simpler configuration than those previously existing. Independently of this, it is also no longer necessary in particular cases to provide an address bus.

Those parts of the multimaster bus system that are not required at a respective time in order to set up a connection between two devices and/or nodes needing to be connected to one another are preferably put into a defined state for the time during which they are not required, this state preferably being a state in which the energy consumption of the multimaster bus system parts in question is as low as possible.

Such a configuration can be achieved, for example:

by virtue of the multiplexers having an additional input connection;

by virtue of a signal having a particular level or a particular level characteristic being applied to the additional input connection, the level or level characteristic preferably being chosen such that the energy consumption brought about by switching through the signal that has this level or level characteristic is minimal; and/or by virtue of the bus controller ensuring, at times at which a multiplexer is not required for setting up a connection between two devices and/or nodes needing to be connected to one another, that the multiplexer in question switches through the signal applied to the additional connection by actuating the multiplexer as appropriate.

Based upon all the above, the multimaster bus system described can be used to set up a plurality of connections simultaneously between the devices connected thereto with minimal complexity.

We claim:

1. A multimaster bus system for devices, a plurality of which are bus master devices, comprising:
 a bus having connection points at which the devices are connected to said bus and having bus segments selectively connectable to one another, said bus adapted to connect at least one of the devices to at least another of the devices, said bus having at least one of data and signal paths, each of said paths having a respective configurable course;
 nodes disposed at said connection points and between said bus segments; and
 a central multimaster bus controller connected to said bus, to each bus master device and to each of said nodes, said multimaster bus controller adapted to control at least one of said bus and allocation of said bus and, pursuant to a request from a bus master device, to configure said courses of said paths by selecting the path through said nodes, and by setting each of said nodes of said path in order to connect said bus segments and create the selected path through said nodes.

2. The multimaster bus system according to claim 1, wherein said multimaster bus controller is adapted to dynamically configure said courses of said paths.

3. The multimaster bus system according to claim 2, wherein said nodes each have at least one switching device.

4. The multimaster bus system according to claim 3, wherein:
said nodes each have at least two ports; and
each of said at least two ports is adapted to:
supply one of data and signals to said nodes; and
output at least one of data and signals from said nodes.

5. The multimaster bus system according to claim 4, wherein said nodes are adapted to:
receive information through one of said ports, the information including at least one of data and signals; and
output the received information through at least one of said ports.

6. The multimaster bus system according to claim 5, wherein said at least one switching device is adapted to set:
if a respective one of said nodes outputs the information supplied thereto; and
through which one of said ports of said respective node output the information supplied thereto.

7. The multimaster bus system according to claim 6, wherein said at least one switching device is a multiplexer.

8. The multimaster bus system according to claim 7, wherein:
each of said ports has an associated multiplexer; and
information switched through by said multiplexers is information output from said ports associated with a respective one of said multiplexers.

9. The multimaster bus system according to claim 8, wherein:
said multiplexers have input connections;
information is supplied to one of said nodes having a respective one of said multiplexers; and
said input connections of said multiplexers respectively have the supplied information applied thereto.

10. The multimaster bus system according to claim 9, wherein said input connections of said multiplexers have the information applied thereto which is supplied to one of said nodes through said ports with which a respective one of said multiplexers is not associated.

11. The multimaster bus system according to claim 4, wherein each of said ports is connected to one of:
a bus segment; and
a device to be connected to said bus.

12. The multimaster bus system according to claim 4, wherein said nodes are adapted to:
receive at least one of data and signals through one of said ports; and
output the received one of data and signals through said one port.

13. The multimaster bus system according to claim 4, wherein said nodes are adapted to:
receive at least one of data and signals through a first of said ports; and
output the received one of data and signals through another of said ports.

14. The multimaster bus system according to claim 3, wherein said bus controller is adapted to set up said at least one data and signal path by respectively actuating said at least one switching device contained in at least one of said nodes to permit the devices connected to said bus to be connected to one another.

15. The multimaster bus system according to claim 14, wherein said bus controller simultaneously permits a plurality of the devices connected to the bus to connect to other ones of the devices when said bus controller is able to set up said at least one data and signal path required therefor.

16. The multimaster bus system according to claim 3, wherein adjacent ones of said bus segments are selectively connected to one another and isolated from one another through a respective one of said nodes disposed therebetween.

17. The multimaster bus system according to claim 3, wherein said nodes connect the devices to said bus.

18. The multimaster bus system according to claim 3, wherein said at least one switching device is a multiplexer.

19. The multimaster bus system according to claim 3, wherein said bus controller controls said at least one switching device.

20. The multimaster bus system according to claim 3, wherein said bus controller is connected to and controls said at least one switching device.

21. The multimaster bus system according to claim 1, wherein said bus controller is adapted to receive, from the devices connected to said bus:
notices of a desire to use said bus to connect to another of the devices; and
information regarding which of the devices is to be connected thereto.

22. The multimaster bus system according to claim 21, wherein said bus controller is adapted to receive, from the devices connected to said bus, information regarding a data transfer direction for the connection requested to be established.

* * * * *